United States Patent
Chang

(10) Patent No.: US 12,382,958 B2
(45) Date of Patent: Aug. 12, 2025

(54) COMPOSITION COMPRISING N6-BENZYLAMINOPURINE FOR CONTROLLING PLANT GROWTH, PREPARATION METHOD THEREFOR, AND USE THEREOF

(71) Applicant: In Kook Chang, Chungcheongbuk-do (KR)

(72) Inventor: In Kook Chang, Chungcheongbuk-do (KR)

(*) Notice: Subject to any disclaimer, the term of this patent is extended or adjusted under 35 U.S.C. 154(b) by 815 days.

(21) Appl. No.: 17/615,624

(22) PCT Filed: Nov. 22, 2019

(86) PCT No.: PCT/KR2019/016168
§ 371 (c)(1),
(2) Date: Dec. 1, 2021

(87) PCT Pub. No.: WO2020/246670
PCT Pub. Date: Dec. 10, 2020

(65) Prior Publication Data
US 2022/0240511 A1    Aug. 4, 2022

(30) Foreign Application Priority Data

Jun. 5, 2019  (KR) .................. 10-2019-0066864
Nov. 21, 2019 (KR) .................. 10-2019-0150709

(51) Int. Cl.
*A01N 43/90*   (2006.01)
*A01N 25/04*   (2006.01)

(52) U.S. Cl.
CPC ............ *A01N 43/90* (2013.01); *A01N 25/04* (2013.01)

(58) Field of Classification Search
None
See application file for complete search history.

(56) References Cited

U.S. PATENT DOCUMENTS

| | | |
|---|---|---|
| 5,744,424 A | 4/1998 | Dedolph |
| 7,906,459 B2 | 3/2011 | Wang |
| 9,023,762 B2 | 5/2015 | Devisetty |
| 9,968,088 B2 | 5/2018 | Wikeley |
| 2010/0216641 A1 | 8/2010 | Wang |
| 2015/0189885 A1 | 7/2015 | Wikeley |
| 2016/0165885 A1 | 1/2016 | Wikeley |

FOREIGN PATENT DOCUMENTS

| | | |
|---|---|---|
| CN | 103749508 A | 4/2014 |
| CN | 105432646 A | 3/2016 |
| CN | 106489933 A | 3/2017 |
| CN | 107251899 A | 10/2017 |
| CN | 107333796 A | 11/2017 |
| CN | 108719341 A | 11/2018 |
| CN | 108902162 A | 11/2018 |
| EA | 27488 B1 | 7/2017 |
| JP | 2009508908 A | 5/2009 |
| KR | 100336248 B1 | 11/2002 |
| KR | 1020090038032 A | 4/2009 |
| KR | 1020140014387 A | 2/2014 |
| KR | 1020140040223 A | 4/2014 |
| RU | 2552174 C1 | 2/2014 |
| WO | 1993021767 A1 | 11/1993 |
| WO | 2015024995 A1 | 2/2015 |

OTHER PUBLICATIONS

Cayman Chemical (6-BAP Product Information, 2023) (Year: 2023).*
Supplementary European Search Report for EP 19932016.9 dated Sep. 7, 2023 (7 pages).
First Office Action for RU 2022106032/10(012625) dated Sep. 21, 2022, (8 pages), and translation (8 pages).
Russian Search Report for RU 2022106032/10(012625) dated Sep. 20, 2022 (2 pages), and translation (2 pages).
Rongeai Yuan and Duane W. Greene, "Benzyladenine as a Chemical Thinner for 'McIntosh' Apples. I. Fruit Thinning Effect1s and Associated Relationships with Photosynthesis, Assimilate Translocation, and Nonstructural Carbohydrates", J. Amer. Soc. Hort. Sci 1285(2):169-176, (2000).
James W. Rushing, "Cytokinins Affect Respiration, Ethylene Production, and Chlorophyll Retention of Packaged Broccoli Florets", HortScience 25 (1):88-90. (1990).
Shunzhao Sui, Jianghui Luo, Daofeng Liu, Jing Ma, Weiting Meu, Lu Fan, Yu Bai, and Mingyang LF, "Effects of Hormone Treatments on Cut Flower Opening and Senescene in Wintersweet (Chimonanthus praecox)", HortScience 50(9): 1356-1369, (2015).
Muhammad Iqbal, Muhammad Ashraf, Amer Jamil, "Seed enhancement with cytokinins: changes in growth and grain yield in slat stressed wheat plants", Plant Growth Regulation 50(1):29-39, (2006).

* cited by examiner

*Primary Examiner* — Craig D Ricci
(74) *Attorney, Agent, or Firm* — Renner, Kenner, Greive, Bobak, Taylor & Weber

(57) ABSTRACT

The present invention relates to a composition for plant, comprising 6-benzyl aminopurine (6-BAP), a fatty acid as a solvent, and an emulsifier, to an emulsifiable concentrate formulation (EC) for producing an oil-in-water emulsifiable concentrate or an oil-in-water emulsifiable concentrate using the same, to a method for preparing the compositions, to a plant growth or development regulating method, or to a fruit thinning method.

12 Claims, No Drawings

COMPOSITION COMPRISING N6-BENZYLAMINOPURINE FOR CONTROLLING PLANT GROWTH, PREPARATION METHOD THEREFOR, AND USE THEREOF

TECHNICAL FIELD

The present invention provides a composition for an increased solubility of N6-benzylaminopurine which shows low solubility in water or ordinary organic solvents, by using an environmentally safe substance.

BACKGROUND ART

N6-benzylaminopurine (6-BAP) is a plant growth hormone belonging to cytokinin, and is a substance involved in plant growth and development. 6-BAP is a biochemical substance having a chemical structure in which a benzyl group is substituted at the N6-position of adenine. 6-BAP is currently commercialized as an agricultural chemical, and is known to exist in synthetic products, but also exist in nature.

Cytokinin including 6-BAP has the effects of promoting cell division, promoting tissue differentiation, inhibiting respiration and thus preventing leaf senescence, breaking dormancy of axillary bud, increasing the moisture and nutrient retention of plant cells and thus withstanding drought, promoting shoot differentiation in callus tissues, and dropping young fruit when used in a high concentration equal to or higher than the growth or development promoting concentration (Amer. Soc. Hort. Scio 125(2):169-176. 2000).

6-BAP is registered as agricultural chemicals in many countries around the world and is used as a plant growth or development regulator. 6-BAP is applied variously in plant growth regulators, such as for fruitlet thinning (Hort. Science 25(1): 88-90, 1990), for extending the shelf life of vegetables and cut flowers (Hort. Science 50(9): 1365-1369, 2015), for enlarging kiwi and watermelon fruit, accelerating melon and blueberry fruiting, and enhancing the numerical yield of drought-stress wheats (Plant Growth Regulation 50(1): 29-39, 2006), and the like, without being limited only to these applications.

6-BAP has a feature that it has very low solubility in water (44 mg/1 L $H_2O$ at 15° C.) and low solubility in ordinary organic solvents. U.S. Pat. No. 5,744,424 has been suggested that it can be dissolved up to 50% in glycols containing alcohol or propylene glycol and alkaline hydroxy compounds. However, most commercially used 6-BAP formulations are liquid formulations (US2010/0216641 A1, U.S. Pat. No. 7,906,459 B2), which are formulations with a low content of active ingredients (about 1% to 2 wt. % in concentration). Formulations with a low content of these active ingredients increase the manufacturing cost of the product and are inefficient in terms of transportation, shelf space, and storage.

Recently, water-dispersible suspension concentrates with a high content of active ingredients have been disclosed (US2015/0189885 A1. U.S. Pat. No. 9,023,762 B2). It is known that systemic chemicals such as plant hormones (chemicals that are absorbed and function inside plant cells) with liquid formulations generally have higher absorption efficiency and leave lower residues of agricultural chemicals than powder formulations such as wetting powders. Additionally, U.S. Pat. No. 9,968,088 describes that cytokinin active ingredient is water soluble up to 10% by weight as a water soluble granule, but specifically (Example E1, Table 5), only 0.76% (w/w) of BAP (6-BAP) was found to be contained as an active ingredient. Furthermore, there is no mention of whether BAP (6-BAP) has been completely dissolved in water.

DETAILED DESCRIPTION OF THE INVENTION

Technical Problem

An object of the present invention is to provide a formulation of liquid composition having a high content of 6-BAP active ingredients. In particular, the present invention relates to an emulsifiable concentrate (EC) composition of 6-BAP. The present invention is a composition of an oil-in-water (o/w) emulsifiable concentrate that can be used by diluting with water N6-benzylaminopurine, a type of plant hormone cytokinin regulating the growth and development of plants, a preparation method therefor, and use thereof.

Another object of the present invention is to provide an efficient fruit-thinning composition. It is yet another object of the present invention to provide a composition composed of materials prepared based on environmentally safe and naturally occurring "green chemicals", especially animal and vegetable oils.

Technical Solution

The present invention provides a composition used for plant comprising N6-benzylaminopurine (6-BAP), a fatty acid and an emulsifier, a preparation method therefor and use thereof. N6-benzylaminopurine is represented as 6-benzyladenine, 6-BAP, 6-BA or the like, but they are the same compound.

A further embodiment of the present invention provides a composition used for plant, or specifically a composition used for a plant growth or development regulator or a fruit-thinning agent in plant. Particularly, another embodiment provides a method that can be used for useful applications, such as for fruit thinning, fruit enlargement, fruit set, freshness maintenance of fruits, vegetables and flowers, improvement in yields of crops, regulation of plant growth and development, and the like.

In one embodiment of the present invention, the composition for the regulation of plant growth according to the present invention may be an emulsifiable concentrate (EC) or a stable oil-in-water (o/w) emulsion composition and has the degree of blooming and the emulsion stability of the composition. Specifically, the composition used for plant according to the present invention can be used by preparing an oil-in-water emulsion composition.

The composition used for plant according to the present invention may be an emulsifiable concentrate, an emulsion, an emulsion solution, an emulsion composition, or an emulsion composition formulation. As used herein, the above terms refer to formulations in which an oil phase or an aqueous phase is homogeneously suspended or dispersed in an aqueous phase or an oil phase using an emulsifier. In the present specification, the above terms can include an emulsifiable concentrates (EC) that need to be diluted with water, or be often used interchangeably with each other. As used herein, the term "emulsifiable concentrate" in a narrow sense is a liquid delivery system preferable for agriculturally active compounds.

Hereinafter, the present invention will be described in more detail.

The composition for plant according to one embodiment of the present invention may include 6-BAP, a fatty acid as a solvent, and an emulsifier, and may further include a co-solvent in order to prepare a composition with increased 6-BAP content. Thus, the composition for plant according to the present invention includes (i) a composition comprising 6-BAP, a fatty acid as a solvent and an emulsifier, and (ii) a composition comprising 6-BAP, a fatty acid as a solvent, an emulsifier and a co-solvent. The (i) and (ii) compositions may further contain at least one selected from the group consisting of an antioxidant and an oil phase (oily) material. That is, optionally, in addition to the co-solvent for increasing the content of 6-BAP and the fatty acid for increasing the emulsion stability in the emulsifiable concentrate, a composition including additional oil phase substances such as oil and lipid components is provided.

The composition for plant according to the present invention may be an emulsifiable concentrate or an oil-in-water (o/w) emulsion composition, and has the blooming degree and the emulsion stability of the emulsion composition. The emulsifiable concentrate according to the present invention is non-aqueous, and can be used as an oil-in-water emulsion when diluted with water. Specifically, the emulsifiable concentrate according to the present invention can be emulsified with water at a weight ratio of 10 to 100,000 times or preferably 100 to 10,000 times at a weight ratio based on 1 of the emulsifiable concentrate, to prepare an oil-in-water emulsion composition.

Specifically, when the composition for plant according to the present invention is used for promoting the growth or development, 6-BAP concentration can be used in the range of about 1 ppm to 50 ppm, and for example, an oil-in-water emulsion composition can be prepared and used by emulsifying with water at a weight ratio of 100 to 20,000 times. When the composition for plant according to the present invention is used for fruit thinning, 6-BAP concentration can range from about 50 ppm to 200 ppm, and for example, an oil-in-water emulsion composition can be prepared and used by emulsifying 10% by weight of an emulsifiable concentrate (EC) in water at a weight ratio of 500 to 2,000 times.

The present invention relates to an oil-in-water (o/w) emulsifiable concentrate (EC) composition that can be used by diluting with water N6-benzylaminopurine (6-BAP), a type of plant hormone cytokinin that regulates plant growth and development, and a preparation method therefor and used thereof. The present invention relates to a composition containing a fatty acid as both oil phase of emulsion and solvent for 6-BAP, together with oil, emulsifier and antioxidant, and optionally, to a 6-BAP emulsion composition comprising a co-solvent of 6-BAP for increasing the content of 6-BAP in the emulsion.

This emulsifiable concentrate may contain 6-BAP as an active ingredient, wherein the content of the active ingredient may be 0.1% to 25% by weight, 0.1 to 23% by weight, 0.1 to 20% by weight, 0.1 to 17% by weight, 0.1 to 15% by weight, 0.5% to 25 by weight %, 0.5 to 23% by weight, 0.5 to 20% by weight, 0.5 to 17% by weight, 0.5 to 15% by weight, 1.0% to 25%. 1.0 to 23% by weight, 1.0 to 20% by weight, 1.0 to 17% by weight, 1.0 to 15% by weight, 1.5% to 25%, 1.5 to 23% by weight, 1.5 to 20% by weight, 1.5 to 17% by weight, 1.5 to 15% by weight, 2.0% to 25%. 2.0 to 23% by weight, 2.0 to 20% by weight, 2.0 to 17% by weight, 2.0 to 15% by weight, 2.5% to 25%, 2.5 to 23% by weight, 2.5 to 20% by weight, 2.5 to 17% by weight, or 2.5 to 15% by weight, or preferably 1.0% to 25% by weight, 1.0 to 23% by weight, 1.0 to 20% by weight, 1.0 to 17% by weight, or 1.0 to 15% by weight.

The fatty acid used in the composition for plant may use a linear or branched, saturated or unsaturated fatty acid having C6 to C22, for example, carboxylic acid as both an oil phase substance and 6-BAP solvent in the composition. In specific examples of fatty acids, examples of saturated fatty acids include hexanoic acid, heptanoic acid, caprylic acid (C8), pelargonic acid (C9), capric acid (C10), undecylic acid (C11), lauric acid (C12), tridecylic acid (C13), myristic acid (C14), pentadecanoic acid (C15), palmitic acid (C16), margaric acid (C17), stearic acid (C18), nonadecvlic acid (C19), arachidic acid (C20), heneicosylic acid (C21), behenic acid (C22); and examples of unsaturated fatty acids include α-linolenic acid (18:3), stearidonic acid (18:4), eicosapentaenoic acid (EPA, 20:5), docosahexaenoic acid (DHA, 22:6), α-linolenic acid (18:3), stearidonic acid (18:4), eicosapentaenoic acid (EPA, 20:5), docosahexaenoic acid (DHA, 22:6), linoleic acid (18:2), γ-linolenic acid (18:3), dihomo-γ-linolenic acid (20:3), arachidonic acid (20:4), adrenic acid (22:4), palmitoleic acid (16:1), Bakson's acid (18:1), paulinic acid (20:1), oleic acid (18:1), elaidic acid (trans-18:1), Gondo acid (20:1), erucic acid (22:1), and Mead acid (20:3). Preferably, the fatty acid includes 1-hexanoic acid, 1-octanoic acid, 1-nonanoic acid, oleic acid (C18), and the like.

In the composition for plant according to the present invention, the content of the fatty acid may be 0.1% to 85% by weight, 0.1% to 80% by weight, 0.1% to 75% by weight, 0.5% to 85% by weight, 0.5% to 80% by weight, 0.5% to 75% by weight, 1.0% to 85% by weight, 1.0% to 80% by weight, 1.0% to 75% by weight, 3.0% to 85% by weight, 3.0% to 80% by weight, 3.0% to 75% by weight, 5.0% to 85% by weight, 5.0% to 80% by weight, or 5.0% to 75% by weight. When the fatty acid content is excessive, it is difficult for other ingredients including the active ingredient to be contained in an appropriate amount, and when the fatty acid content is too small, there is a problem that the content of the active ingredient is lowered. The fatty acid may be used as a solvent or dispersant of 6-BAP, and an oil phase component.

In another embodiment, the composition for plant according to the present invention relates to a composition for the regulation of plant growth or development, or a composition for fruit thinning, which is an emulsifiable concentrate comprising one or more fatty acids, 6-BAP and an emulsifier. In order to increase the content of 6-BAP in the emulsifiable concentrate, one or more co-solvents of 6-BAP may be added. Suitable co-solvents include organic acids, or the like, and the organic acids may be carboxylic acids including glycolic acid, acetic acid, propionic acid, sulfonic acids including alkyl and aryl acid or the like, phenols, and the like, without being limited thereto, and may include amino acids that can dissociate hydrogen ions and bind to a base. Besides the organic acid, the co-solvent includes glycols such as propylene glycol and alcohols. In addition to the composition for plant according to the present invention. 6-BAP content can be increased by using organic acids, glycols, and alcohols as co-solvents. These organic acids may be carboxylic acids including glycolic acid, acetic acid, propionic acid, sulfonic acids including alkyl and aryl acid, phenols and the like, without being limited thereto, and may include amino acids that can dissociate hydrogen ions and bind to a base.

Specifically, the co-solvent may be at least one selected from the group consisting of C1-C5 organic acids. C2-C5 hydroxycarboxylic acid (mono-, di-, or polycarboxylic acid), C2-C5 glycol and C1-C5 alcohol.

In the composition for plant according to the present invention, the content of the co-solvent is preferably 0.1% to 50% by weight, and more preferably 1% to 40% by weight. When the content of co-solvent is 1% by weight or less, the increase in the content of the active ingredient is slight, and when the content of the co-solvent is 40% by weight or more, a problem may occur in the emulsifying property of the emulsifiable concentrate.

The composition for plant according to the present invention may further include at least one selected from the group consisting of an oil phase substance and an antioxidant. The content of oil phase substance excluding fatty acids may be 0% by weight to 60% by weight, or the content of the antioxidant may be 0.1% by weight to 10% by weight, based on 100% by weight of the total composition.

The oil phase component suitable for the composition according to the present invention are animal and vegetable oils, essential oils, fatty acid esters, fatty alcohols, mineral oils, etc. and additionally may also include any oil or hydrophobic compound with appropriate HLB and solubility. In this emulsifiable concentrate, oil regulates HLB so that emulsification can be properly performed, and simultaneously, functions as a coupling agent of connecting fatty acids and co-solvents. If the content of the oil phase substance in this emulsifiable concentrate is too high, for example, if the content is 50% by weight or more, the content of fatty acids and the content of co-solvent are reduced to decrease the content of active ingredients, which is thus inefficient.

Yet another embodiment provides a more stable emulsifiable concentrate composition with added with oils or lipid components. These oils or lipid components may be composed of essential oils, fatty acid methyl or ethyl esters, fatty alcohols, fatty amines, animal or vegetable oil and fat, mineral oil, or a complex thereof, without being limited thereto. The substances that are hydrophobic and soluble in the emulsifiable concentrate, such as alkyl and aryl substances and solid lipids can be added and used as oil phase components.

Specifically, the oil phase substance may be at least one selected from the group consisting of vegetable oils, essential oils (lavender, pepper mint, eucalyptus, etc.), mineral oils, fatty alcohols (C6-C22 fatty alcohols and their combinations, linear or branched, saturated or unsaturated) and fatty acid esters (C6-C22 fatty acid esters or their combinations, linear or branched, saturated or unsaturated). The fatty alcohol may be, for example, a C8-C22 linear or branched, saturated or unsaturated fatty alcohol, and the fatty acid ester may be, for example, a C8-C22 linear or branched, saturated or unsaturated fatty acid ester. Fatty acid esters are esters of fatty acids and alcohols, specifically fatty acid alkyl esters, and fatty acids may be C8-C22 linear or branched, saturated or unsaturated fatty acids, and the alkyl may be a C1-C6 alkyl, and specifically, may be at least one selected from the group consisting of a methyl ester of octanoic acid and a methyl ester of decanoic acid.

Further, the content of the oil phase substances excluding fatty acids may be 0% to 60% by weight based on 100% by weight of the composition for plant use. The essential oil usually refers to aroma oil or volatile oil that is collected and refined from flowers, leaves, fruits, branches, stems, and roots of plants.

The antioxidant may be at least one selected from the group consisting of tocopherol-based compounds, butylated hydroxy toluene (BHT), propylgallate, and butylated hydroxyl anisole, and specifically, antioxidants used for food, such as BHA (butylated hydroxy anisole), BHT (butylated hydroxy toluene), propylgallate, tocopherols (alpha, beta, gamma or delta tocopherol and their combinations), and tert-butylhydroquinone, but are not limited thereto. In the composition for plant according to the present invention, the content of the antioxidant may be 0.1% by weight to 10% by weight, or preferably 1% by weight to 5% by weight.

In the present emulsifiable concentrate, the emulsifier may include an anionic emulsifier, a nonionic emulsifier, or a combination thereof, but a nonionic emulsifier is more preferable. Nonionic emulsifiers may include many emulsifiers such as sorbitan fatty acid ester series (Span), polyoxyethylene sorbitan fatty acid ester series (Tween), glycerol ester series, alcohol ethoxylate series, glycol ester series, sucrose ester series, and amide series. The anionic emulsifier may be alkylbenzene sulphonates, acyl lactylate, dialkyl sulfosuccinate, or the like.

The emulsifier for emulsifying the composition includes an appropriate HLB (hydrophilic-hydrophobic balance) anionic, or nonionic emulsifier, or a combination of one or more thereof. Preferred emulsifiers include polyoxyethylene (20) (POE 20) sorbitan fatty acid ester (Tween or TW) or sorbitan fatty acid ester (Span or SP) series nonionic emulsifier, but the emulsifier is not limited thereto.

In the composition of the present invention, the emulsifier may be contained in an amount of 1% to 50% by weight, but more preferably 5 to 35% by weight. When the content of the emulsifier is less than 5% by weight, the emulsifier concentration is low when diluted with water, so that emulsification is difficult and oil may be separated. When the content of the emulsifier is 35% by weight or more, the content of other components is reduced and an inefficient emulsifiable concentrate is produced.

The method for preparing the composition for plant according to the present invention includes a step of heating and dissolving 6-BAP in a fatty acid, or fatty acid and co-solvent at a temperature of 30° C. to 90° C., 50° C. to 90° C., 60° C. to 85° C., or 60° C. to 80° C. Further, after the dissolving step, a step of sequentially adding an antioxidant and an emulsifier is further performed, or when an oil component is included, a step of sequentially adding an antioxidant, an oil component, and an emulsifier may be further performed. It is preferable to add the oil component in the order of hydrophilic oil component and hydrophobic oil component among oil types.

Specifically, the composition for plant according to the present invention, for example, an emulsifiable concentrate is prepared as follows. A certain amount (about 0.1~2 gram) of 6-BAP was first dissolved in a small amount (1~7 gram) of fatty acid, or fatty acid and co-solvent while shaking frequently in a laboratory oven at a temperature between 60° C. and 85° C. within 24 hours. If dissolution is not performed within 12 hours, the oven temperature was raised to an interval of 5 to 10° C. to adjust the dissolution time. If the oven temperature is too low, the dissolution time of 6-BAP becomes longer, and the decomposition of 6-BAP may occur. If the oven temperature is too high, the decomposition of 6-BAP may occur.

When other components are added to the dissolved 6-BAP solution, the addition is performed in the order of an antioxidant, a hydrophilic oil, a hydrophobic oil, and an emulsifier among oil types, and after the components are completely dissolved at the time of adding each component, the next components are added. Further, each component is added after being prepared at the same temperature as the 6-BAP solution. Of the respective components, the solid component is dissolved by heating in an oven at 50 to 80° C. after addition.

A composition comprising the composition for plant according to the present invention is applied to a plant and can be prepared as a composition used as a plant growth or development regulator or as a fruit thinning agent. Further, the composition for plant according to the present invention can be prepared into an oil-in-water emulsion composition and applied to a fruitlet thinning method.

In another embodiment, the present invention provides a method for preparing a 6-BAP emulsifiable concentrate. 6-BAP not only has low solubility in ordinary solvents, but also has a slow dissolution rate in fatty acids or organic acids, etc., so it is preferable to prepare 6-BAP by raising the temperature to a specific temperature at the time of preparation. These temperatures may vary depending on the constituents in the composition, but the temperature from 50° C. to 90° C. is preferred. Further, the mixing sequence at the time of preparation is important, which may vary depending on the constituents in the composition.

Another embodiment provides a method of emulsifying a 6-BAP emulsifiable concentrate in water and spraying it as a growth or development regulator onto plants. The use concentration (w/v) and use amount of 6-BAP active ingredient, the amount sprayed, the number of sprays, and the spraying method may vary depending on the intended use.

In another embodiment, the present invention provides a method that can be used for useful applications, such as for fruit thinning, fruit enlargement, fruit set, freshness maintenance of fruits, vegetables and flowers, improvement in the yield of crops, or plant growth and development regulator.

The composition for plant according to the present invention may be prepared as a 6-BAP oil-in-water (o/w) emulsifiable concentrate (EC) composition, the method of use includes forming micelles when diluted with water, and spraying the dispersed and diluted solution to evenly cover the epidermis of a plant and allowing it to penetrate into the cells. The dilution factor for water is in a weight ratio from 100 times of water for emulsifiable concentrate 1 to 100,000 times of water for emulsion 1, and the dilution factor can be adjusted according to the intended use. For example, in the enlargement of apple fruit, the 6-BAP concentration is used from about 15 ppm to 30 ppm, and when spraying 15% by weight of the active ingredient, it is diluted in a ratio of 5,000 to 10,000 times. Emulsions, e.g. oil-in-water emulsions (EW), may be, for example, other formulation types and, as already mentioned as an example above, it can be prepared by means of a stirrer, a colloid mill and/or a static mixture using aqueous organic solvents and, where appropriate, surfactants.

Specifically, in addition to the spraying, the method of using this emulsifiable concentrate can inject an emulsifiable concentrate into a tree with diluting with water or without dilution, or dilute an emulsifiable concentrate with a solvent to coat it onto the seed, drench it in the watering system, or dip a part of the plant such as cut flower, graft, seed, or fruit, thereby obtaining the desired effect.

The composition for plant according to the present invention is emulsified in water at a weight ratio of 100 to 5,000 times to prepare an oil-in-water emulsion composition, and can be used for a method for thinning young fruits.

Advantageous Effects

Specifically, in addition to this spraying, the method of using the present emulsifiable concentrate can including injection of an emulsifiable concentrate into a tree with diluting with water or without dilution, coating seed with diluting with solvent, drenching it in the watering system, or dipping a part of the plant such as cut flower, graft, seed, or fruit, thereby obtaining the desired effect.

The composition for plant according to the present invention is emulsified in water at a weight ratio of 100 to 5,000 times to prepare an oil-in-water emulsion composition, and can be used for a method for thinning young fruits.

DETAILED DESCRIPTION OF THE EMBODIMENTS

Hereinafter, the present invention will be described in more detail with reference to examples. However, the scope of the present invention is not intended to be limited to the following examples Example 1

In Example 1, the composition was prepared by measuring 6-BAP active ingredient (purity 99%) and putting to a 20 ml glass vial, using only 6-BAP, fatty acids, antioxidants and emulsifiers, without adding any co-solvent or additional oil phase components.

Specifically, for the preparation of IAP-3104-27-1 composition, 0.31 g of 6-BAP was dissolved in 5 g of 1-octanoic acid (purity 98.5%) at 60 to 80° C. for 24 hours, added and mixed with 0.3 g of tocopherol as an antioxidant, and then added with 1.5 g of polysolvate 20 (TW20). In a specific method of dissolution, 6-BAP was dissolved in fatty acids while shaking often in a laboratory oven at a temperature between 60° C. and 85° C. within 24 hours. If it was not dissolved within 12 hours, the dissolution time was adjusted by raising the oven temperature to a temperature at intervals of 5 to 10° C.

Further, IAP-3104-27-3 composition was prepared in the same manner as in IAP-3104-27-1, but was prepared with the same constituents, except that 1.5 g of polysolvate80 (TW80) as an emulsifier instead of polysolvate20 (TW20) (Table 1). In the emulsifiable concentrates of IAP-3104-27-1 and IAP-3104-27-3 prepared in this example, the content of 6-BAP was 4.36 wt % in IAP-3104-27-1 and IAP-3104-27-3, and the content of 6-BAP was 4.69 wt % in IAP-3109-8-1 and IAP-3109-8-3

TABLE 1

| IAP Code | 6-BAP | Fatty acid | Antioxidant (Tocopherol) | Emulsifiers |
|---|---|---|---|---|
| IAP-3104-27-1 | 0.31 g | C8 5 g | 0.3 g | TW20 1.5 g |
| IAP-3104-27-3 | 0.31 g | C8 5 g | 0.3 g | TW80 1.5 g |
| IAP-3109-8-1 | 0.31 g | C9 5 g | 0.3 g | TW80 1 g |
| IAP-3109-8-3 | 0.31 g | C9 5 g | 0.3 g | Mixing (TW80 0.7 g + TW20 0.3 g) |

C9: 1-nonanoic acid
C8: 1-octanoic acid
TW20: Polysorbate 20
TW80: Polysorbate 80

When emulsifying the prepared emulsifiable concentrate composition in water, the emulsion must remain stable for a certain period of time in the temperature range in which the plant grows. In order to test the emulsification degree and stability of the above prepared emulsifiable concentrate, the emulsion states after 3 hours and 24 hours of emulsification at room temperature were measured and rated as follows. Specifically, after 3 hours and 24 hours of emulsification, whether oil was separated from micelle, whether the active ingredient 6-BAP formed a crystal, and whether the degree to which the cream was formed, were recorded. Thereby, the following stability rating and blooming rating were determined and recorded.

As long as an emulsion liquid diluted for spraying do not cause chemical injury to plants and do not reduce its activity, the degree of instability in which cream is formed is not a major issue in use because the formation of the cream is prevented by continuous mixing in a spray container. However, when the emulsifiable concentrate was injected into trees or the like, or dipped in cut flower or the like, a stable emulsifiable concentrate was required, and thereby, after 3 and 24 hours of emulsification, the emulsion stability and the degree of blooming were assessed as follows. The results are shown in Table 3 below.

0.16 g of each emulsifiable concentrate composition prepared in Example 1 was pipetted into 80 cc (0.2% w/w) tap water, and tested for the degree of bloom formation, the emulsion stability was visually assessed, and the pH of the diluent was determined, when subsequently diluted and mixed in water with a spatula for 1 minute. Water for determining the emulsion stability was tap water in a laboratory, and at the time of emulsification, the temperature of water was 22° C. and the pH was 7.48.

As described above, the degree of bloom formation was assessed by a rating from 0 to 3, and the emulsion stability was assessed by a rating from 0 to 3 after 3 hours and 24 hours of emulsification.

(1) Degree of Blooming

The test water was a laboratory tap water with a pH of 7.48 at 22° C.

(2) Emulsion Stability (3 Hours and 24 Hours)

TABLE 2

Evaluating criteria of degree of blooming and emulsion stability

| Item | Score | Evaluating criteria |
|---|---|---|
| Degree of blooming | 0 | When injected into water at a ratio of 500 times, it is not emulsified, and even when mixed, it is not emulsified. |
| | 1 | When injected into water at a ratio of 500 times, it is not naturally emulsified, but when mixed by hand, it is emulsified. |
| | 2 | If injected into water at a ratio of 500 times, it starts to be naturally emulsified, but when mixed by hand, it is emulsified immediately. |
| | 3 | If injected into water at a ratio of 500 times, it is bloomed and naturally emulsified. The test water was a laboratory tap water at 22° C. having a pH of 7.48. |
| Emulsion stability | 0 | The emulsified emulsion liquid is separated into water and oil within a given time, and is not emulsified when mixed again. |
| | 1 | The emulsified emulsion liquid is separated into water, oil and cream within a given time, and is not emulsified again. |
| | 2 | The emulsified emulsion liquid is separated into water, oil and cream within a given time, but is emulsified again. |
| | 3 | The emulsified emulsion liquid is not separated within a given time, and is stably dispersed. |

The results of assessing the emulsion stability and the degree of blooming are shown in Table 3 below. In Table 3, the emulsification degree and stability are presented. Specifically, the macroemulsion according to the example prepared satisfies all of 1 or more of rating, which is an emulsion stability enough to be used for plants. Usually, in the case of using emulsifiable concentrates in the field, when the rating of emulsion stability is 3 or less, the diluted liquid is sprayed while stirring. Power sprayers and agricultural sprayers have a mixing device and a stirring device, and thus, when the rating of emulsion stability is 1 or more, there is no problem in use.

TABLE 3

Degree of emulsion blooming and emulsion stability

| IAP Code | 6-AP % (w/w) | Degree of blooming | Emulsion stability (3 hr) | Emulsion stability (24 hr) | 0.2% diluent pH |
|---|---|---|---|---|---|
| 1. IAP-3104-27-1 (1-Octanoic acid) | 4.4% | 1 | 2 | 1.5 | 4.16 |
| 2. IAP-3104-27-3 (1-Octanoic acid) | 4.4% | 1.2 | 7 | 1 | 4.19 |
| 3 IAP-3109-8-1 (Nonanoic acid) | 4.7% | 1.2 | 2 | 1.5 | 4.38 |
| 4. IAP-3109-8-3 (nonanoic acid) | 4.7% | 1 | 2 | 1.5 | 4.61 |

6-BAP content of IAP-3104-27-1 was 4.3 wt. %. When 0.16 g of this emulsifiable concentrate was injected into 80 ml tap water (22° C., pH 7.48) with a pipette, it was not naturally emulsified, but it was emulsified when stirred with a spatula. After 3 hours and 24 hours of emulsification, a little cream was formed, but when stirred, it was emulsified again and relatively stable. The pH of the emulsion liquid (0.2% w/w) was 4.16. The content of 6-BAP in the emulsifiable concentrate is a rounded value. IAP-3104-27-3 (4.3% EC) was also tested for the emulsion stability in the same manner as described above. As a result, emulsification naturally progressed very slowly, but when stirred, it was emulsified. After 3 hours, a little cream was formed and relatively stable, but after 24 hours, cream was formed and a little oil was separated, so that the stability was relatively low, but it showed 1, which is an emulsion stability enough to be used for plants.

IAP-3109-8-1 and IAP-3109-8-3 were prepared in which 0.31 g of 6-BAP was dissolved in 5 g of 1-nonanoic acid at 70-85° C. for 18 hours, added with 0.3 g of antioxidant tocopherol, and then mixed with several different types of emulsifier.

IAP-3109-8-1 was slowly and naturally emulsified when injecting 4.6 wt. % 6-BAP into water with a pipette so as to form 0.2% (w/w) emulsifiable concentrate, but it was emulsified when stirred. IAP-3109-8-3 was not naturally emulsified, but it was emulsified when stirred. 6-BAP emulsifiable concentrates based on two nonanoic acids produced a lot of cream after 3 hours and after 24 hours, but when stirred, it was emulsified again, and it had the emulsion stability at a level having no problem in use for spraying.

Example 2

This example illustrates oil-in-water (o/w) emulsifiable concentrates of 6-BAP prepared using various types of oil phase substances without the aid of co-solvent from 6-BAP active ingredient (99% purity).

For the preparation of IAP-3103-1-3, 0.41 g of 6-BAP active ingredient was determined and placed in a 20 ml glass vial, 4.4 g of 1-hexanoic acid (purity 98%) was added, and then dissolved at 65-70° C. for 24 hours. 0.3 gram of antioxidant BHT (butylated hydroxytoluene) was added to the dissolved 6-BAP solution, dissolved at 60° C., and then 0.5 gram of 1-octanol was added and mixed. When 1-octanol was completely mixed at room temperature, 3.4 g of light mineral oil (specific gravity of 0.83) was added and mixed, and then 2 g of polyoxyethylene (20) sorbitan monolaurate (TW20, polysolvate 20) and 0.3 g of sorbitan monolaurate (SP20) emulsifier pair were added to prepare a 3.9% (w/w) 6-BAP emulsifiable concentrate.

For the preparation of IAP-3104-26, 0.41 g of 6-BAP was dissolved in 5 g of 1-octanoic acid (purity 98.5%), and then 4 g of methyl ester of 1-octanoic acid ($MC_8$, purity 99%) was added and mixed. To the oil solution in which 6-BAP was dissolved, 0.8 g of emulsifier polysorbate (TW80), 1 g of TW20, and 0.5 g of SP20 were added to prepare a 3.4% (w/w) 6-BAP emulsifiable concentrate. The preparation method of IAP-3104-26 was the same as the preparation method of IAP-3103-1-3.

For the preparation of IAP-3109-2-1, 0.31 g of 6-BAP active ingredient was dissolved in 4 g of 1-nonanoic acid (purity 97%) at a temperature of 70-80° C., and then 0.21 g of tocopherol as an antioxidant. 2.8 g of soybean oil (edible oil, Ottogi Corporation), 1 g of $MC_8$ as oil phase components, 1.2 g of TW80 and 0.3 g of sorbitan monooleate (SP80) as an emulsifier were mixed to prepare a 3.4% (w/w) 6-BAP emulsifiable concentrate.

For the preparation of IAP-3118-7-2, 0.31 g of 6-BAP was dissolved in 5 g of oleic acid at 70-80° C., then 0.21 g of antioxidant tocopherol was added, 2.8 g of soybean oil (edible oil, Ottogi Corporation) was mixed, and then 1.2 g of emulsifier TW80 and 0.3 g of SP80 were mixed to prepare a 3.5% (w/w) 6-BAP emulsifiable concentrate. The components and contents of the emulsifiable concentrate composition prepared in this example are shown in Table 4 below.

TABLE 4

Compositions of 6-BAP solubilized in fatty acids

| IAP Code | 6-BAP | Fatty acid | Oil | Anti-oxidant | Emulsifiers (mixing) |
|---|---|---|---|---|---|
| 1. IAP-3103-1-3 (1-Hexanoic acid) | 0.41 g | C6 4.4 g | MO 3.4 g $C_8OH$ 0.5 g | BHT 0.3 g | TW80 1.2 g SP20 0.3 g |
| 2. IAP-3104-26 (1-octanoic acid) | 0.41 g | C8 5 g | $MC_8$ 4 g | — | TW20 1 g SP20 0.5 g TW80 0.8 g |
| 3. IAP-3109-2-1 (1-Nonanoic acid) | 0.31 g | C9 4 g | Soy oil 2 g $MC_8$ 1 g | Tocopherol 0.21 g | TW80 1.2 g SP80 0.3 g TW20 0.5 g |
| 4. IAP-3118-7-2 (Oleic acid) | 0.31 g | C18 4 g | Soy oil 2.8 g | Tocopherol 0.21 g | TW80 1.2 g SP80 0.3 g TW20 1 g |

$C_6$: 1-Hexanoic acid
$C_8$: 1-octanoic acid
$C_9$: 1-nonanoic acid
$C_{18}$: oleic acid
SP20: sorbitan monolaurate
$C_8OH$: 1-octanoic acid
SP80: sorbitan monoleate
$MC_8$: methyl ester of 1-octanoic acid
MO: light mineral oil
Soy oil: soybean oil
BHT: butylated hydroxy toluene In an attempt to assess the emulsification degree and stability of the above prepared emulsifiable concentrate, 0.16 g of each emulsifiable concentrate composition prepared above was pipetted into 80 cc (0.2% w/w) tap water, and the degree of bloom formation of these emulsifiable concentrates, and the emulsion stability when subsequently diluted and mixed with water by a spatula for 1 minute, was visually assessed, and the pH of the diluent was determined and the results were recorded. Water for measuring the emulsion stability was tap water in a laboratory. At the time of emulsification, the temperature of water was 22° C. and the pH was 7.48.

The degree of bloom formation and the emulsion stability of the prepared emulsifiable concentrate composition after 3 hours and 24 hours of emulsification were assessed in substantially the same manner as in Example 1. The results are shown in Table 5 below.

TABLE 5

Degree of emulsion blooming and emulsion stability

| IAP Code | 6-BAP (w/w) | Degree of blooming | Emulsion stability (3 hr) | Emulsion stability (24 hr) | 0.2% diluent pH |
|---|---|---|---|---|---|
| 1. IAP-3103-1-3 (1-Hexanoic acid) | 3.9% | 1 | 2.5 | 3 | 4.03 |
| 2. IAP-3104-26 (1-octanoic acid) | 3.5% | 1.8 | 2 | 1 | 4.45 |
| 3. IAP-3109-2-1 (1-Nonanoic acid) | 3.2% | 2.5 | 2 | 1.5 | 3.98 |
| 4. IAP-3118-7-2 (Oleic acid) | 3.1% | 1.8 | 2 | 2 | 6.44 |

When 0.16 g of IAP-3103-1-3 was injected into 80 ml of water with a pipette, no bloom was formed, and it became translucently emulsified after stirring with a spatula for 1 minute. After 3 hours and after 24 hours, the cream was not formed and it was stable. When IAP-3104-26 was diluted at 0.2% (w/w) with tap water, emulsification proceeded slowly on the surface, and it became emulsified when stirred. Cream was formed after 3 hours, but it was emulsified again when stirred. However, after 24 hours, oil was separated and was relatively unstable.

For IAP-3109-2-1, bloom was formed and it was naturally emulsified. After 3 hours, cream was formed, but when stirred, it was uniformly emulsified again. After 24 hours, cream and a little oil were formed, but when stirred, it was emulsified again and were relatively stable.

IAP-3118-7-2 was slowly and naturally emulsified, but it became quickly emulsified when stirred. After 3 hours, cream was formed, and when stirred, it was emulsified again. Both IAP-3109-2-1 and IAP-3118-7-2 had relatively stable emulsion properties.

Example 3

In this example, in order to increase the content of 6-BAP in the emulsifiable concentrate, an emulsifiable concentrate composition was prepared using an organic acid as a co-solvent. Specifically, lactic acid or propionic acid was used as a co-solvent. In addition to soybean oil, mineral oil, methyl octaoate as the oil used in Example 1, a mixture of 1-octanoic acid methyl ester/1-decanoic acid methyl ester (MC8/MC10) and an emulsifier were used, and the preparation method was substantially identical to the method of Example 1.

TABLE 6

| IAP Code | 6-BAP | Fatty acid | Co-solvent | Oil | Antioxidant | Emulsifiers |
|---|---|---|---|---|---|---|
| 1. IAP-3104-13-1 (1-Octanoic acid) | 0.73 g | $C_8$, 4 g | LA 0.7 g | $MC_8$ 2 g MO 2 g | — | TW80 1.5 g SP80 1 g |

TABLE 6-continued

| IAP Code | 6-BAP | Fatty acid | Co-solvent | Oil | Antioxidant | Emulsifiers |
|---|---|---|---|---|---|---|
| 2. IAP-3104-16-1 (1-Octanoic acid) | 0.61 g | $C_8$, 4 g | LA 0.75 g | $MC_8/MC_{10}$ 3 g | — | TW20 1.25 g<br>TW80 1 g<br>SP20 0.5 g |
| 3. IAP-3109-1 (1-Nonanoic acid) | 0.61 g | $C_9$, 4 g | LA 0.8 g | $MC_8$ 1 g<br>MO 3.95 g | BHT 0.4 g | TW20 2 g<br>SP20 1.03 g |
| 4. IAP-3118-3 (Oleic acid) | 1.51 g | $C_{18}$, 3 g | LA 2.5 g | $MC_8$ 2.5 g<br>$C_6OH$ 1 g | — | TW80 1 g<br>TW20 0.5 g |
| 5. IAP-3104-11 (1-Octanoic acid) | 1.01 g | $C_8$, 3 g | PA 1.5 g | MO 3 g | — | TW80 1.25 g<br>SP80 0.25 g |

$MC_8/MC_{10}$: mixture of 1-octanoic acid methyl ester/1-decanoic acid methyl ester
LA: Lactic acid
BHT: butylated hydroxy toluene The emulsion stability and the blooding degree of the prepared emulsifiable concentrate composition after 3 hours and 24 hours of emulsification were assessed in substantially the same manner as in Example 1. The results are shown in Table 7 below.

TABLE 7

| IAP Code | 6-BAP % (w/w) | Degree of blooming | Emulsion stability (3 hr) | Emulsion stability (24 hr) | 0.2% diluent pH |
|---|---|---|---|---|---|
| 1. IAP-3104-13-1 (1-Octanoic acid) | 6.1% | 1.8 | 2 | 1 | 3.97 |
| 2. IAP-3104-16-1 (1-Octanoic acid) | 5.4% | 1.6 | 2.3 | 1.5 | 3.92 |
| 3. IAP-3109-1 (1-Nonanoic acid) | 5.4% | 2 | 3 | 3 | 4.16 |
| 4. IAP-3118-3 (Oleic acid) | 12.4% | 1.8 | 2.5 | 1.5 | 3.63 |
| 5. IAP-3104-11 (1-Octanoic acid) | 10% | 2 | 2 | 1.5 | 4.14 |

The emulsification method of the emulsifiable concentrate prepared in Example 5 was substantially the same as in Example 2. IAP-3104-13-1 is 6-BAP 6.1% oil-in-water (o/w) EC, and when injected at 0.2%, it was emulsified on the surface of water, and when mixed with a spatula for 1 minute, it was completely emulsified, but after 3 hours, cream started to form on the surface of water. The cream thus formed was uniformly distributed again when mixed. Therefore, the degree of blooming and the emulsion stability were 1.8 and 2. IAP-3104-16-1 is 5.4 wt. % of 6-BAP EC, and when the emulsifiable concentrate was injected at 0.2 wt. %, it sank and floated, and then was slowly emulsified. When mixed with a spatula for 1 minute, it was completely emulsified, but after 3 hours, a little cream was formed, and when mixed again, it was dispersed.

IAP-3109-1 is 4.4 wt. % EC prepared using 1-nonanoic acid (C9) as a main solvent. When this emulsifiable concentrate was injected at 0.2 wt. %, the emulsion was spread over the surface, the emulsion slowly entered in the water, but when mixed with a spatula, it was completely emulsified in water. Even after 3 hours, it maintained a stable emulsion state without cream formation.

IAP-3118-3 is 12.4 wt. % EC of 6-BAP prepared using oleic acid as a solvent. When this emulsifiable concentrate was injected at 0.2 wt. %, it was slowly emulsified while the emulsion being subsided, but when mixed with a spatula, it was emulsified immediately. Even after 3 hours, only a little cream was formed, and when mixed again, it was emulsified uniformly.

IAP-3104-11 is 10 wt. % EC of 6-BAP prepared using 1-octanoic acid as a main solvent and propionic acid as a co-solvent. When this emulsifiable concentrate was injected at 0.2 wt. %, it was emulsified on the surface of the water, and when mixed, it was emulsified, but after 3 hours, cream was formed. When this cream was mixed again with a spatula for about 30 seconds, it was uniformly emulsified again.

The above compositions are examples in which stable emulsifiable concentrates can be prepared with different fatty acids, co-solvents, other oil types and emulsifiers, and experts in this field can easily prepare stable emulsifiable concentrates by different combinations, without being limited to the above compositions.

Example 4

The preparation method of the emulsifiable concentrate composition is substantially the same as in Example 3, wherein components and contents of the 6-BAP EC composition prepared using one or more fatty acid mixtures as the main solvent are shown in Table 8 below.

TABLE 8

| IAP Code | 6-BAP | Fatty acids | Co-solvent | Oil | Antioxidant | Emulsifiers |
|---|---|---|---|---|---|---|
| 1. IAP-3104-8-1 (1-Hexanoic acid) (1-Octanoic acid) | 0.41 g | $C_8$ 3 g<br>$C_6$ 1.5 g | — | MO 2 g | — | TW80 1 g<br>SP2 0.5 g |
| 2. IAP-3110-1-6 (1-Nonanoic acid) (Oleic acid) | 1.22 g | $C_9$ 1.5 g<br>$C_{18}$ 1.5 g | LA 1.5 g | $MC_8$ 3 g | BHT 0.38 g | TW8 1 g<br>TW2 1 g<br>SP20 0.3 g |
| 3. IAP-3119 (1-octanoic acid) (1-nonanoic acid) | 1.01 g | $C_8$, 2.25 g<br>$C_9$, 2.25 g | LA 0.7 g | MO 2.4 g<br>$MC_8$ 0.8 g | BHT 0.3 g | TW80 1.2 g<br>SP20 0.9 g |

The emulsion stability and the degree of blooding of the prepared emulsifiable concentrate composition after 3 hours and 24 hours of emulsification were assessed in substantially the same manner as in Example 1. The results are shown in Table 9 below.

TABLE 9

| IAP Code | 6-BAP % (w/w) | Degree of blooming | Emulsion stability (3 hr) | Emulsion stability (24 hr) | 0.2% diluent pH |
|---|---|---|---|---|---|
| 1. IAP-3104-8-1 (1-Hexanoic acid) (1-Octanoic acid) | 4.9% | 2 | 2.3 | 2.5 | 4.1 |
| 2. IAP-3110-1-6 (1-Nonanoic acid) (Oleic acid) | 10.6% | 2.5 | 2.5 | 3 | 3.86 |
| 3. IAP-3119 (1-octanoic acid) (1-nonanoic acid) | 8.5% | 1.2 | 1.5 | 1 | 4.2 |

IAP-3104-8-1 is a 4.9 wt. % 6-BAP EC prepared using 1.5 g of 1-hexanoic acid and 3 g of 1-octanoic acid as a solvent without a co-solvent. When this emulsifiable concentrate was injected at 0.2% (w/w) into 80 cc of tap water, the emulsifiable concentrate was slowly emulsified, but when mixed with a spatula, it was easily and uniformly emulsified. After 3 hours of emulsification, a little cream was formed, but after 24 hours, no more cream was formed, and after 24 hours, the emulsion was also stable. IAP-3110-1-6 is a 10.6 wt. % 6-BAP emulsifiable concentrate prepared using a fatty acid mixed with 1-nonanoic acid and oleic acid in a ratio of 1:1 as a main solvent and lactic acid as a co-solvent. When 0.16 g of this emulsifiable concentrate was injected into 80 cc of tap water, it was slowly and naturally emulsified while being sank and floated. When mixed with spatula. For the emulsion stability after 3 hours, a little cream was formed on the surface, but it was uniformly emulsified. After 24 hours, there was almost no cream, and the emulsion was uniformly stable.

IAP-3119 is 8.5 wt. % 6-BAP EC prepared using a main solvent in which I-octanoic acid and 1-nonanoic acid were mixed in a ratio of 1:1. BHT was used as an antioxidant, and when this emulsifiable concentrate was injected at 0.2% (w/w) into tap water, emulsification started slowly on the surface while being sank and floated, but when mixed with spatula, emulsification was properly performed. After 3 hours, a little cream and oil were separated, and when mixed, it was emulsified again, but after 24 hours, more cream and oil were separated. Thus, the stability was lower than that of IAP-3104-8-1 or IAP-3110-1-6 described above. The acidity (PH) of the diluent was reduced according to the amount of co-solvent (lactic acid, propionic acid).

Example 9

In order to confirm the plant growth regulation activity of the 6-BAP emulsifiable concentrate of the present invention, three types of 6-BAP fatty acid emulsifiable concentrates were prepared, and shown in Table 10 below. These 6-BAP emulsifiable concentrates were prepared using 1-octanoic acid as the main solvent and lactic acid or propionic acid as a co-solvent.

The emulsion stability and the degree of blooding degree of the prepared emulsion composition after 3 hours and 24 hours of emulsification were assessed in substantially the same manner as in Example 2, and the results are shown in Table 11 below.

TABLE 10

6-Benzyladein compositions for apple fruitlet thinning

| IAP Code | 6-BAP | Fatty acid | Co-solvent | Oil | Emulsifier |
|---|---|---|---|---|---|
| 1. IAP-3104-11 (1-octanoic acid) | 1.01 g | 3 g | PA 1.5 g | MO 3 g | TW80 1.25 g SP80 0.25 g |
| 2. IAP-3104-16 (1-octanoic acid) | 1.01 g | 3 g | LA 0.75 g | $MC_8/MC_{10}$ 3 g | TW20 2.25 g SP20 0.5 g |
| 3. IAP-3104-22 (1-octanoic acid) | 1.01 g | 3 g | LA 1 g | $MC_8/MC_{10}$ 1 g MO 4 g | TW20 1.5 g SP20 1 g |

TABLE 11

Degree of emulsion blooming and emulsion stability

| IAP Code | 6-BAP % (w/w) | Degree of blooming | Stability (3 hr) | Stability (24 hr) | 0.2% Diluent pH |
|---|---|---|---|---|---|
| 1. IAP-3104-11 (1-octanoic acid) | 10% | 2 | 2 | 1.5 | 4.14 |
| 2. IAP-3104-16 (1-octanoic acid) | 9.5% | 1.5 | 2 | 1 | 4.06 |
| 3. IAP-3104-22 (1-octanoic acid) | 8% | 2.2 | 3 | 2.5 | 3.99 |

As shown in Table 11 above, the emulsion stability after 3 hours were all relatively stable, and the stability until spraying to determine the biological activity was maintained. IAP-3104-16 and 3104-22 were in a semisolid state at room temperature, but dissolved again when heated to 50° C., and used in the test.

Example 10

Using the emulsifiable concentrate composition prepared in Example 9, apple fruit thinning ability of 6-BAP was tested in order to confirm the biological activity. The apple varieties are Fuji varieties, and a fruitlet cluster in which tree age was 18 years, tree vigor was good and the size of central fruit was 7 mm to 9 mm, was selected and tested by two methods. The experimental results are presented in Table 12 below.

In the first method, 7 trees that had been pre-treated with a fruit thinning agent were replicated 7 times, and 2 fruitlet cluster were selected for each tree per treatment. 6-BAP emulsifiable concentrate (concentration: 80 mg/liter (80 ppm, w/v)) was sprayed in one direction per fruitlet cluster so that the amount sprayed at one time was 0.45 ml, and sprayed at 0.9 ml in total per fruitlet cluster in both directions. The spraying angle was sprayed with a DIA 570 small sprayer (manufacturer: Furupla, Japan), which was modified to an angle of 45° from above based on the central flower of the fruitlet cluster. The diluent of the 6-BAP EC compositions was prepared with tap water (pH 7.48) one day in advance, so that the water temperature was room temperature. The experimental design was a randomized block design.

In the second test, 5 apple trees that had not been treated with the fruit thinning agent were replicated 5 times. For each treatment, three fruitlet clusters, in which the size of central fruit per tree was 7 to 9 mm, were selected one by one in each direction, and sprayed with the same 6-BAP concentration and method as in the first test. The experimental design was a randomized block design with 5 replications. The temperature at the time of spraying chemicals ranged from 18.8° C. to 23.8° C. and the humidity ranged from 24 to 42 wt. %.

The effect of fruit thinning was obtained by counting lateral fruits that did not drop after treatment for a certain period of time, subtracting from the number of lateral fruits before treatment with chemicals and dividing the number of dropped lateral fruits by the number of initial lateral fruits. Before the chemical spraying, the number of lateral fruits per fruitlet cluster was selected and recorded as large (more than 6 mm), medium (4~6 mm), and small (less than 4 mm). Since the fruit thinning of the apple is a task of selecting the central fruit and removing the lateral fruit, the fruit thinning effect of these apples was obtained by recording the lateral fruit that did not drop according to size after 32 days of treatment with chemicals. In Table 12, only the fruit thinning effect of lateral fruits with a size of 6 mm or more were added together in Experiments 1 and 2, and the average value was compared to that of untreated group and the fruit thinning ratio was presented. When the size of lateral fruit is 6 mm or less. 70% or more of the fruits naturally drops even without treatment. Thus, the fruit thinning ratio of lateral fruit and the fruit thinning ratio of central flower, in which natural dropping was not properly performed and the size was 6 mm or more, were presented.

IAP-3104-11 and IAP-3104-22 showed higher emulsion stability than that of IAP-3104-16 (Table 12), but the effect was lower than that of IAP-3104-16. However, all of the three 6-BAP emulsifiable concentrates showed a significantly higher thinning ratio compared to untreated group. The thinning rate of the central fruits was 18.1% in IAP-3104-22, butt was 6.9% in IAP-3104-11 and IAP-3104-16, compared to 2.8% in untreated group. The Fuji varieties are known as varieties for which fruit thinning with chemicals is difficult.

TABLE 12

| IAP Code | Number of lateral fruits with a diameter of 6.0 mm or more | Number of lateral fruits dropped | % thinning activity | |
|---|---|---|---|---|
| | | | Lateral fruit | Central fruit |
| 1. IAP-3104-11 | 54 | 24 | 44.4 | 6.9 |
| 2. IAP-3104-16 | 53 | 28 | 52.8 | 6.9 |
| 3. IAP-3104-22 | 57 | 25 | 43.9 | 18.1 |
| 4. control | 64 | 7 | 10.9 | 2.8 |

The invention claimed is:

1. A composition for application to a plant, comprising N6-benzylaminopurine (6-BAP) dissolved in a fatty acid, and an emulsifier,
    wherein the content of 6-BAP is in the range of 0.5% to 15% by weight, based on the total weight of the composition,
    wherein the content of the fatty acid is in the range of 5% to 80% by weight, based on the total weight of the composition, and is selected from the group consisting of 1-hexanoic acid, 1-octanoic acid, 1-nonanoic acid, and oleic acid, and combinations thereof, and
    wherein the emulsifier is selected from the group consisting of sorbitan fatty acid esters, polyoxyethylene sorbitan fatty acid esters, alcohol ethoxylates, and dialkyl sulfosuccinates; and
    wherein the composition further includes a co-solvent when the 6-BAP content is in the range of 6% to 15%, wherein the co-solvent is selected from the group consisting of C1 to C5 organic acids, C2-C5 hydroxycarboxylic acids, C2-C5 glycols, and C1-C5 alcohols.

2. The composition according to claim 1, wherein the composition further comprises at least one of an oil phase substance and an antioxidant, wherein the at least one of the oil phase substance and the antioxidant may optionally include a co-solvent.

3. The composition according to claim 2, wherein the content of the oil phase substance excluding fatty acids is 0% to 60% by weight, or the content of the antioxidant is 0.1% to 10% by weight, based on 100% by weight of the total composition.

4. The composition according to claim 2, wherein the antioxidant is at least one selected from the group consisting of tocopherol-based compounds, butylated hydroxy toluene (BHT), propylgallate, and butylated hydroxyl anisole.

5. The composition according to claim 2, wherein the content of the emulsifier is 1% to 50% by weight, and the content of the antioxidant is 0.1% to 10% by weight, based on 100% by weight of the total composition.

6. The composition according to claim 2, wherein the oil phase substance is at least one selected from the group consisting of a vegetable oil, an essential oil, a mineral oil, a fatty alcohol having C6-C22, and alkyl ester of a fatty acid having C6-C22, wherein the alkyl has 1 to 6 carbon atoms.

7. The composition according to claim 6, wherein the vegetable oil is soybean oil, or the alkyl ester of fatty acid is at least one selected from the group consisting of a methyl ester of octanoic acid and a methyl ester of decanoic acid.

8. An oil-based emulsifiable concentrate comprising the composition of claim 1.

9. An oil-in-water emulsion comprising the oil-based emulsifiable concentrate of claim 8, and an aqueous medium.

10. A method for preparing the composition for application to the plant as set forth in claim 1 which comprises a step of heating and dissolving 6-BAP in the fatty acid, or the fatty acid and co-solvent, at a temperature of 30° C. to 90° C. and adding the emulsifier.

11. The method according to claim 10, wherein the step of adding the emulsifier includes a step of sequentially adding an antioxidant and the emulsifier, after the dissolving step.

12. The method according to claim 10, wherein the step of adding the emulsifier includes a step of sequentially adding an antioxidant, an oil phase substance and the emulsifier, after the dissolving step.

* * * * *